United States Patent [19]
Alden et al.

[11] 4,067,374
[45] Jan. 10, 1978

[54] PNEUMATIC TIRE

[75] Inventors: John Todd Alden, Akron; Michael Grant Miller, Cuyahoga Falls; Stephen Charles Sabo, Barberton, all of Ohio

[73] Assignee: The B. F. Goodrich Company, Akron, Ohio

[21] Appl. No.: 685,346

[22] Filed: May 11, 1976

Related U.S. Application Data

[63] Continuation-in-part of Ser. No. 513,413, Oct. 9, 1974, abandoned.

[51] Int. Cl.² .......... B60C 9/06; B60C 17/00; B60C 15/02
[52] U.S. Cl. .......... 152/354 R; 152/330 RF; 152/361 R; 152/353 R; 152/379.1
[58] Field of Search ...... 152/352, 353, 354, 355, 152/357, 209 R, 361 R, 374, 362 R, 362 CS, 330 RF, 347, 379, 352 R, 353 R, 379.1

[56] References Cited

U.S. PATENT DOCUMENTS

| | | | |
|---|---|---|---|
| 3,207,200 | 9/1965 | Boussu et al. | 152/354 |
| 3,542,108 | 11/1970 | Rye et al. | 152/354 |
| 3,911,987 | 10/1975 | Takusagawa et al. | 152/353 R |
| 3,935,892 | 2/1976 | Arimura et al. | 152/353 R |
| 3,949,798 | 4/1976 | Gardner et al. | 152/330 RF |
| 3,954,131 | 5/1976 | Hoshino et al. | 152/353 R |

*Primary Examiner*—Drayton E. Hoffman
*Attorney, Agent, or Firm*—Joseph Januszkiewicz

[57] ABSTRACT

A pneumatic tire which can be operated in a deflated condition without damage to the tire, wherein the tire has a cord ply, a tread, a ply with wire cords in the crown, and thick sidewalls wherein the cord ply extends from the heel of the bead to a location closely adjacent to the outer surface of the midpoint of the sidewall and thence towards the inner surface of the crown. The interior portion of the sidewall rubber has a high dynamic modulus with low hysteresis properties and high aging properties.

3 Claims, 5 Drawing Figures

PNEUMATIC TIRE

CROSS REFERENCE

This application is a continuation-in-part of U.S. Patent Application No. 513,413, filed Oct. 9, 1974 now abandoned.

BACKGROUND OF THE INVENTION

This invention relates to pneumatic tires and more particularly to a new and improved safety tire for use in run-flat condition and to self-sealing tires. When a conventional tire is without inflation air, the opposite interior walls of the tire come into contact with the localized pressure of the wheel toward the pavement, causing a severe flexing and buckling action to the cord fabric and the adjacent rubber compounds. Such very high stresses cause a heat build-up and a corresponding failure of the tire. In addition, the tire may be separate from the rim impairing the driver's ability to maintain control of the vehicle.

SUMMARY OF THE INVENTION

According to the present invention, the tire is so constructed that even upon a sudden loss of air pressure within the tire, the tire will provide the usual comfortable cushioning of the vehicle to permit the operator of vehicle to drive the vehicle a considerable distance without injury to the tire or render the vehicle unmanageable. The sidewalls of the tire in accordance with the present invention have the sidewalls of substantial thickness and with the cord reinforcing ply extending from closely adjacent the toe of the tire to a point closely adjacent to the outer surface of the sidewall as it approaches the midpoint of the tire and thence receding away from the outer surface towards the inner surface at the shoulder such as to lie closely adjacent to the inner circumferentially extending inner peripheral surface of the crown of the tire. That is, the cord reinforcing ply is oriented within the sidewall so that the thickest portion of the sidewall rubber is between the inner surface exclusive of the inner liner or inner tube and the cord reinforcing ply, and also thickest between the outer surface of the tire and the cord reinforcing ply at the shoulder portion and the bead portion, although the sidewall is of approximately uniform thickness. Such sidewall as viewed in cross section presents a mass of rubber to the inside of the reinforcing ply that is crescent shaped whereby on complete deflation of the tire, the crescent shaped mass of rubber is put into compression while the cord reinforcing ply is put in tension thereby preventing collapse of the sidewall so that the respective inner wall surfaces of the tire do not contact or rub on each other. To further enhance its run-flat characteristics, a belt with transversely extending wire cords located above the cord reinforcing ply in the crown is placed in compression to reinforce the run-flat conditions. Such circumferentially extending wire ply in the crown region of the tire cooperates with the novel sidewall construction to increase the deflated run-flat performance characteristics. Such wire ply has wire strands that run parallel to the axis of rotation of the tire and has the ends of the wire terminating at the juncture of the tread with the shoulders of the tire. Such sidewall is made of a high dynamic modulus rubber, which as measured on the Goodrich flexometer using the Dynamic Rate Calculation, has a range of values of 3500-5500 psi and an optimum range of 4500 to 5500 psi. Such construction further maintains the tire on the rim without collapse when fully deflated even when braking and effecting sharp turns. Such tire, when fully deflated has good bead seat retention, with no rim cutting or excessive heating. Tests have indicated that such tires, in the fully deflated condition, have permitted a vehicle to transverse 300 miles at 45 mph or higher at 90% Tire and Rim Association rated load at 24 psi without adverse effects to the tire itself. Such tire in the deflated condition is capable of the above described performance on conventional rims without requiring internal lubrication, or depending on a gas generating substance to slightly inflate the tire.

A modification of the tire construction discussed above may include an external compressive mass of rubber or buttress at each of the shoulders of the tire, and an external compressive mass or rubber at the rim portion.

THE DRAWINGS

SPECIFIC DESCRIPTION

This invention can be used in any kind or size of pneumatic tire, but since a constantly increasing proportion of tires are being made with radial cord carcasses, the invention is illustrated in connection with radial cord, tubeless passenger car tires.

Figure 1:
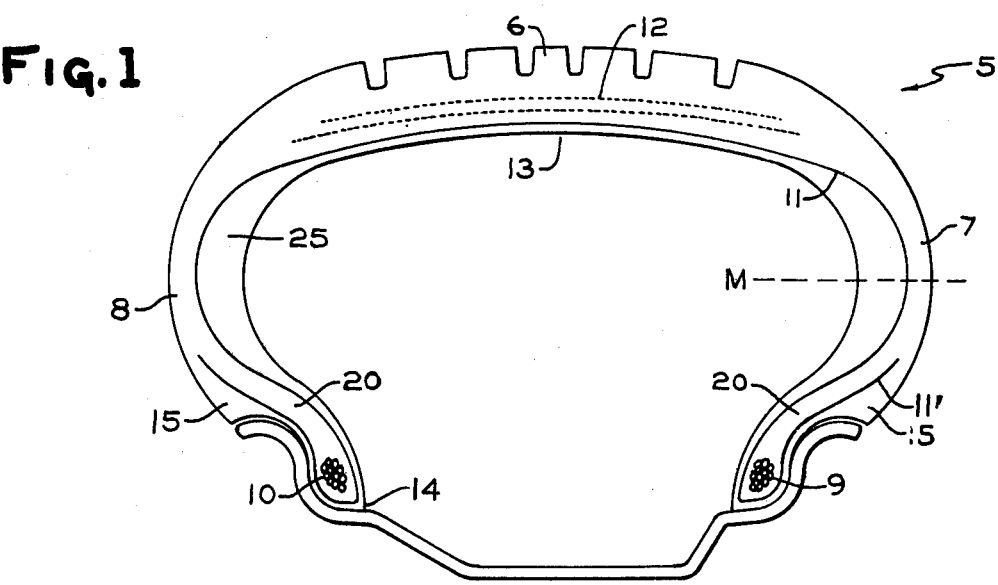
FIG. 1 is a cross-sectional view of one embodiment of the tire of this invention.

Referring to the drawings wherein like reference characters designate like or corresponding parts throughout the several views, there is shown in FIG. 1 a pneumatic tire 5 having a tread 6 and a pair of spaced sidewalls 7 and 8 which extend from the tread 6 to the respective annular beads 9 and 10. The tread 6 is made of abrasion-resistant rubber composition and extends across the road-engaging surface outside of the belt plies and is molded with a suitable non-skid pattern. Tire 5 includes a conventional textile or metal cord in the ply 11 which reinforces the carcass. The ply 11 extends from bead 9 to bead 10 and as shown, extends around the beads and upwardly into the tire carcass sidewalls. The cord reinforcing ply 11 and the beads 9 and 10 are embedded in rubber in the usual manner. The sidewall rubber is of a considerable thickness and has a high dynamic modulus so that it will be stiff enough to support the weight on the wheel. As measured on the Goodrich Flexometer using dynamic rate calibrations, such sidewall rubber has a range of 3500–5500 psi with an optimum of 4500–5500 psi, and as measured with a Durometer using the Short hardness scale, has a hardness of 60–80 with an optimum rating of 70–72. Using the Reolig Dynamic Test Machine at 10% compression and a plus or minus 4% strain cycle, the sidewall rubber should have complex modulus valves (E*) with a range of valves from 900 to 1150 psi or greater. In addition such sidewall rubber should have a low hysteresis to minimize heat generation when the tire is run without inflation. The construction of the tire is symmetrical in relation to the center plane of the tire. The tire is made to hold air in the usual way by a separate inner tube or an integral thin impervious liner such as a butyl rubber, chlorinated butyl, or other suitable elastomer resistant to diffusion of air.

A belt structure indicated generally as 12 is provided between tread 6 and the crown 13 of the tire carcass through which crown 13 the textile cord ply 11 extends for reinforcing the tire 5.

The cord reinforcing ply 11 extends from the bead toe 14 radially outwardly along the inner surface of the tire and thence toward the outer surface of the sidewall 7 towards the midpoint M and thence along such outer surface of the sidewall 7. As such ply 11 approaches the shoulder region of the tire 5, ply 11 again approaches the inner surface of the tire and extends along the inner wall surface of the crown 13 to the other shoulder portion of the tire and thence to the bead 10 in the same manner as described. The thickness of the rubber from ply 11 to the outside surface of the tire at the thickest portion of the crescent shaped mass as compared to the thickness of the rubber ply 11 to the inside surface of the tire is in the range of ratios 1:1.3 to 1:4 exclusive of the liner. As viewed in cross section, the sidewall rubber of the tire inside of the reinforcing ply 11 has a concave shape with the thickest portion at about the midpoint and tapers markedly towards the shoulder and bead regions to present a crescent shaped mass of rubber in cross section which acts as an internal compressive member as to be described. In a 60 series tire, the section height of the tire from the wheel to the tread is 60% of the section width of the tire. Before measuring, tires should be mounted and inflated to 24 psi for load Range B to 28 psi for load Range C and to 32 psi for load Range D, allowed to stand for 24 hours minimum at normal room temperature and inflation pressures adjusted to 24 psi (load Range B), 28 psi (load Range C) and 32 psi (load Range D). Such cresent shaped mass of rubber has a ratio of radial height to maximum thickness (at its thickest point) of about 9 to 1. This ratio may vary somewhat with different size tires such as the 50, 70, or 78 series tires, in a range of about 6:1 to 12:1. In a similar manner, the mass of rubber to the outside of the reinforcing ply 11 is least at the thickest portion of the crescent shaped mass and greatest at a point above the rim adjacent to the bead and shoulder region of the tire. When measuring the radial height of such crescent shaped mass, the height is measured radially from the top of the bead to the inner surface of the crown of the tire. The margin of ply 11 extending from the bead radially outward and ending in the sidewall rubber is herein referred to as the reinforcing turn up ply 11' (FIG. 1) and provides additional means to resist collapse of the tire. The ply 11' is shown as extending around the bead and outward through the sidewall rubber, separated from the main part of ply 11 by a mass of sidewall rubber 20 of approximately uniform thickness. Such mass of rubber 20 acts as a lower internal compressive member in a manner to be described, and helps to support the crescent shaped mass of rubber in the uninflated condition.

The sidewalls of the tire between the shoulder and the rim engaging portion of the tire are of approximately uniform thickness, and of approximately the same thickness as the crown region including the tread and all the underlying structure. At the beads the outside of the tire is shaped to fit the contour of the conventional rim. The portion of the sidewall closest to the rim ends in a substantial rim cushion 15, which is located between the reinforcing cord ply 11' and the margin of the rim flange when the tire is mounted with a small clearance space between the tire and the outer edges of the rim flanges as illustrated in FIG. 1. Such rim cushion 15 acts as an external compression member, together with the sidewall rubber 20 between ply 11 and the external margin of the ply 11; to help support the weight of the vehicle when the tire is uninflated, and thus aids the crescent shaped mass of sidewall rubber inside of ply 11 as described above. In the deflated condition of the tire, such rim cushion 15 increases the bead retention property of the tire. Such rim cushion 15 may be referred to as a lower external compression member.

Figure 2:
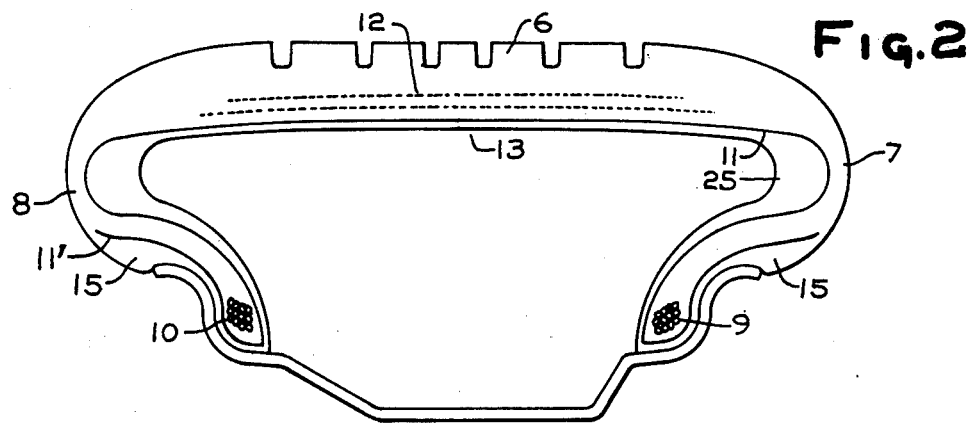
FIG. 2 is a cross-sectional view of the tire shown in FIG. 1 in the fully deflated condition when it is mounted on a rim and is supporting the weight of a vehicle.

In the operation of such tire 5 as described, the tire is inflated to the normal pressure as in conventional tires, and cushions the vehicles in the ordinary way. However, upon a loss in air pressure due to road hazards, puncture of the tire, or other reasons, when the air pressure in the tire is substantially reduced or lost altogether, the weight of the vehicle will somewhat reduce the radial height of the tire 5 where it rests on the road, causing it to assume the shape shown in cross-section in FIG. 2. In that condition, the crescent shaped mass of rubber in each sidewall, inside of the reinforcing ply 11, will be placed in radial compression while the reinforcing ply 11 will be placed in tension, and at the same time, the shoulder rubber and the rim cushion 15 will be placed in partly radial and partly axial compression, thereby resisting collapse of the tire and maintaining the respective sidewalls in a curved rather than a folded condition to eliminate rim cutting, chafing and excessive internal heating which ordinarily in this circumstance cause rapid deterioration and failure of the tire sidewall. In the ordinary collapse of a tire under full vehicle load, the cords in the tire are subjected to a combination of forces including compressive forces which are particularly harmful to them, whereas in the present case the cords are subjected only to a tension load. The tire described above remains on the rim permitting considerable maneuverability even at rather high speeds such as fifty mph. The mass of rubber 20 separating the ply 11 and its margin 11' resists distortion by a combination of forces including radial compression caused by the increased curvature of ply 11 close to the bead 9 or 10, together with radial shear forces between ply 11 and its margin 11'. These forces resist collapse and increase lateral stability which is needed in cornering.

Figure 3:
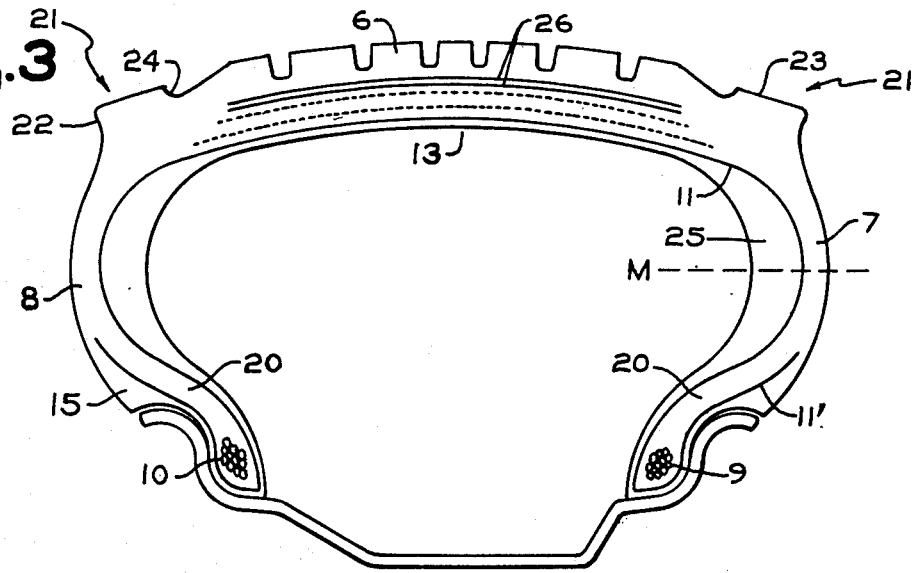
FIG. 3 is a cross-sectional view of a modified form of a tire of this invention.

A modification of the invention as described above is shown in FIG. 3 consisting of the same type of construction having tread 6, sidewalls 7, 8, beads 9 and 10, and the crescent shaped mass of rubber 25 to the inside of the reinforcing ply 11. In addition, such modified form of the tire has a buttress or upper external compressive member 21 at the shoulders of the tire on either side of the tread with a substantially cylindrical surface 23 on the radially outer face thereof, at a smaller distance from the axis than the tread 6, so as not to make contact with the road under normal conditions with the tire fully inflated. The buttress 21 may be spaced from the tread by a shallow groove 24, and may project laterally so as to form a concavity 22 between the corner of the upper surface 23 and the adjacent surface of sidewall 7 or 8. Such buttress or upper external compressive member 21 on deflation of the tire, when tread 6 loses support of inflation gas will have its upper surface 23 pressed against the road surface and cooperating with the crescent shaped mass (designated 25 in FIG. 3) the internal lower compressive member 20, and the lower external compressive member 15 to put the reinforcing ply 11 in tension while the crescent shaped mass 25, the buttress 21, internal lower member 20 and lower external member 15 are put in compression to support the load on the wheel. The tire in this condition provides adequate support for the vehicle and its load, permitting it to transport the vehicle a considerable distance safely at speeds above minimum expressway speeds. In addition to the internal compressive member 25, the internal lower compressive member 20, the lower external compressive member 15, and the upper external compressive member 21, a crown compressive ply 26 made up of relatively stiff wire cords extending transversely across the crown of the tire is located under the tread 6, between the tread and the belt 12. The margins of the compressive ply 26 are located at the juncture of the tread and the shoulders of the tire.

In the normal situation when a conventional radial or bias ply tire loses air and becomes flat, the weight of the vehicle compresses the tire between the wheel rim and the road. This causes the sidewalls to move laterally apart and be pinched between the rim flanges and the road, and the considerable stiffness of the shoulders causes the center of the tread to buckle into the space between the rim flanges.

In this invention, the crown compressive ply 26 provides enough bending stiffness of the crown to prevent inward buckling of the crown of the deflated tire. The transversely extending wires in such ply 26 are placed in compression in such a situation and effectively resist the compressive forces. This is similar to a beam supported at both ends and a load placed on the beam to deflect the beam. The wire cords of ply 26 are placed in compression and the cords of ply 11 are placed in tension which action in cooperation with the placing of the crescent shaped mass 25 in compression effectively resists the inward buckling action at the crown of the tire and effectively facilitates the tire's run-flat characteristics.

Figure 4:
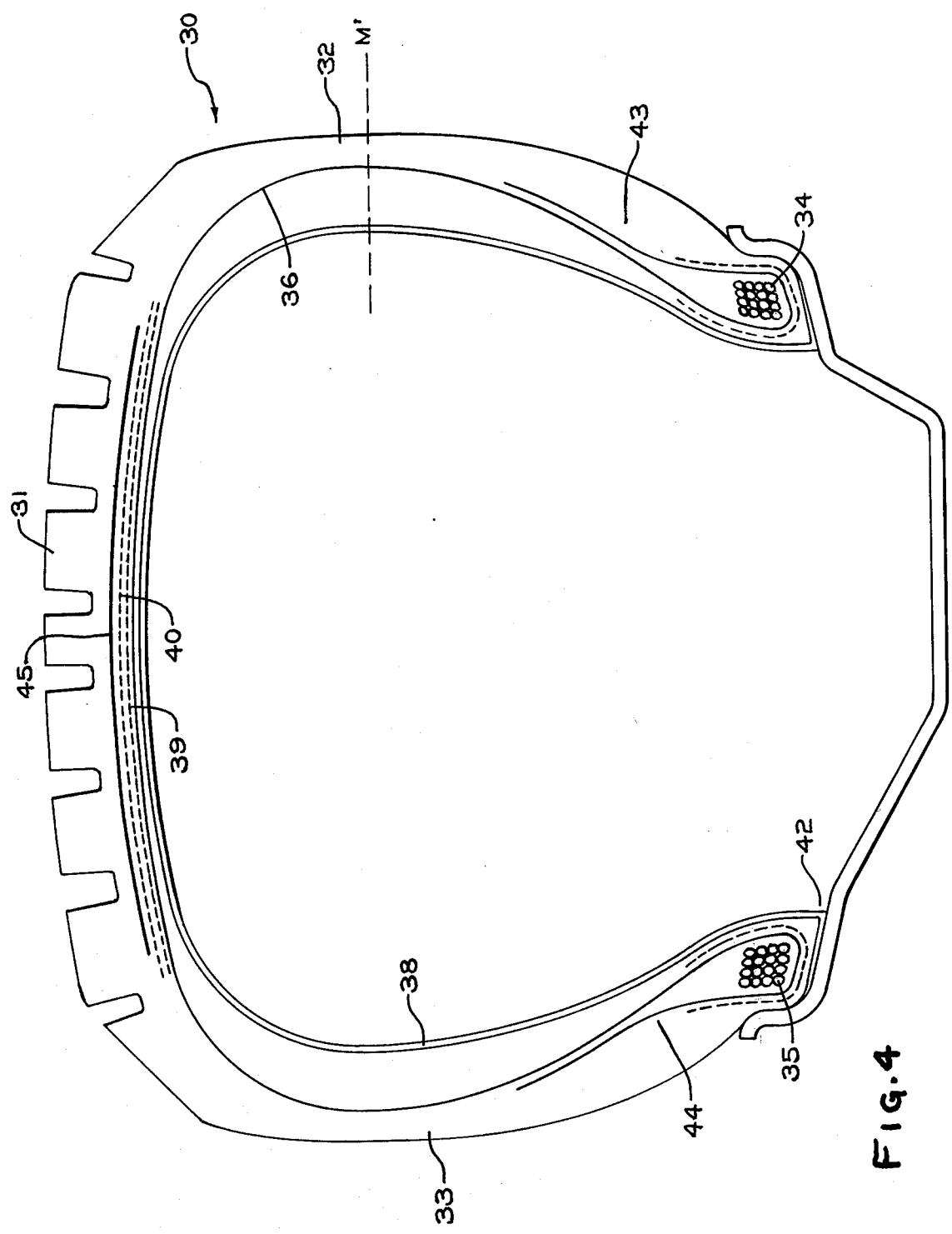
FIG. 4 is a cross-sectional view of another modified form of a tire of this invention.
Figure 5:
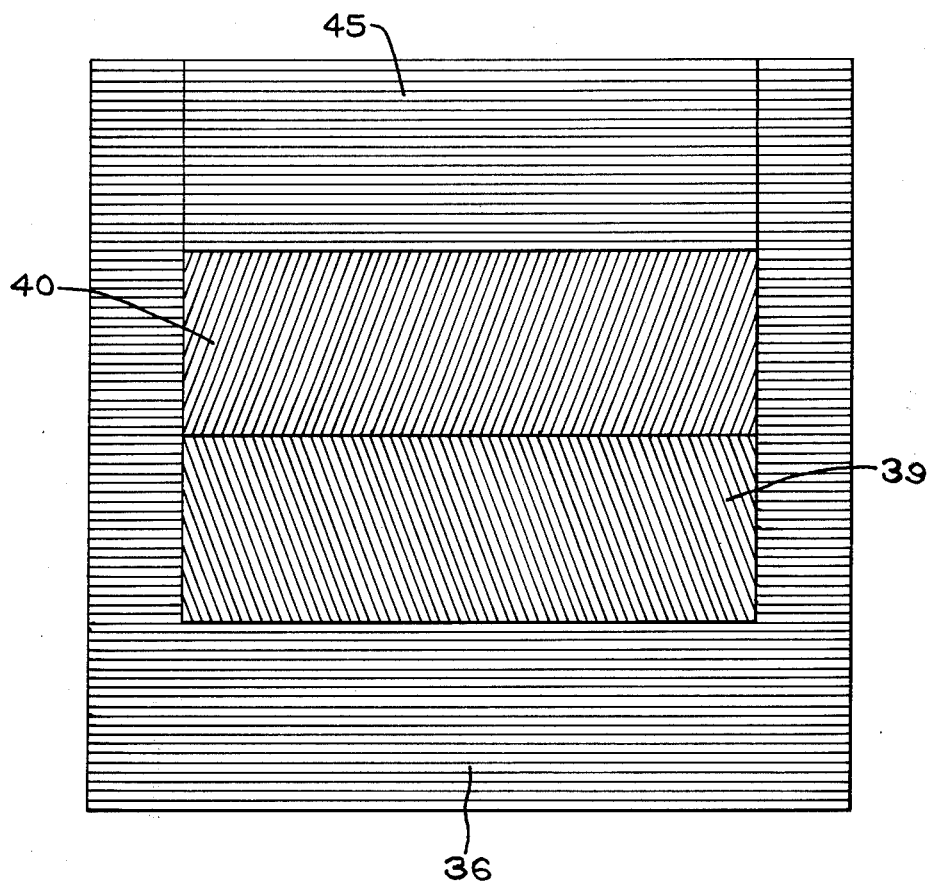
FIG. 5 is a fragmentary plan view of the tire, partly schematic with individual layers broken away in order to represent the directions of the cord in the crown of the tire.

A further modification of the invention is shown in FIG. 4 wherein there is shown a pneumatic tire 30 having a tread 31 and a pair of spaced sidewalls 32 and 33 which extend from the tread 31 to their respective annular beads 34 and 35. The tread is made of abrasion-resistant rubber composition and is molded with a suitable non-skid pattern. Tire 30 includes a conventional textile or metal cord ply 36 which reinforces the carcass plies. The ply 36 extends from bead 34 to bead 35 and as shown, extends around the beads and upwardly into the tire carcass sidewalls. The sidewall rubber has a high dynamic modulus so that it will be stiff enough to support the weight on the wheels. The values stated above for the first described embodiment are applicable herein. The construction of the tire is symmetrical in relation to the center plane of the tire. The tire is made to hold air in the conventional manner as by a thin integral air impervious liner 38 or inner tube resistant to the diffusion of air.

A pair of circumferentially extending belt structures 39 and 40 are provided between tread 31 and the liner 38 of the tire carcass. The textile cord ply 36 extends through the crown of the tire between the liner 38 and the lower belt structure 39.

The cord reinforcing ply 36 extends from the bead toe 42 radially outwardly along the inner surface of the tire and thence towards the outer surface of the sidewall (similar to that described in FIG. 1), and thence along the outer surface of the sidewall 33 gradually toward the inner wall surface of the tire at the shoulder region of the tire and continues along the inner wall surface at the crown portion of the tire to the other shoulder portion of the tire and thence to the bead 34 in the same manner. The respective end portions of the reinforcing ply 36 extend around the respective beads 34 and 35 and extend into the lower portion of the sidewall terminating adjacent to the reinforcing ply 36. At about the midpoint M' of the sidewalls 32 and 33, the thickness of the rubber from ply 36 to the outside surface of the tire as compared to the thickness of the rubber from ply 36 to the inside surface of the tire exclusive of any inner tube or air impervious liner is in the range of ratios 1:1.3 to 1:4. As viewed in cross section (FIG. 4) the sidewall rubber of the tire inside of the reinforcing ply 36, exclusive of the liner or inner tube, has a concave shape with the thickest portion at about the midpoint and extends towards the shoulder and bead regions to present a crescent shaped mass of rubber in cross section which acts as an internal compressive member as to be described. With the reinforcing ply 36 turned up around the beads 34 and 35, an annular mass of high modulus rubber 43, 44 on either side of the tire adjacent to the beads 34 and 35 provide an additional compressive member that aids the tire in its run-flat condition.

Located between the tread 31 and the belt structures 39 and 40 is a circumferentially extending wire belt 45 whose strands are transversely disposed relative to the tire carcass i.e. the wire strands are generally parallel to the axis of rotation of the tire.

In the operation of such tire 30, the tire is inflated to the normal pressure as in conventional tires, and cushions the vehicle in the ordinary way. Upon a loss of air pressure due to a road hazard such as the puncture of the tire, the air pressure in the tire is substantially reduced or lost altogether. The weight of the vehicle will cause the tire disclosed in FIG. 4 to assume a shape disclosed in FIG. 2, wherein the radial height of the tire 30 will be reduced. In this condition, the crescent shaped mass of rubber in each sidewall, inside of the reinforcing ply 36 will be placed in radial compression, the reinforcing ply 46 will be placed in tension while the wire belt 45 will be placed in compression which action resists the collapse of the tire, maintaining the respective sidewalls in a curved rather than a folded condition to eliminate rim cutting, chafing and heat build-up compared to the conventional tire. The conventional tire under a loss of air pressure would permit a buckling of the tread towards the wheel and would cause a chafing of the tire which would cause a movement of the sidewalls away from the retaining bead portion of the rim flanges causing failure of the tire and/or movement of the tire carcass from the rim. In the tire described, the deflated tire under similar conditions would assume the cross-sectional shape shown in FIG. 2 and permit the operation of the vehicle safely at a sufficient rate of speed as discussed above to a service station or a safe location to permit the replacement and/or repair of the deflated tire.

Tires of this invention have demonstrated their ability to support automobiles adequately even when completely deflated so as to permit driving safely and comfortably for a considerable distance on the deflated flat tires until a destination or a repair facility is reached.

We claim:

1. A pneumatic tire comprising a carcass with an annular tread having a circumferentially extending crown therebeneath; said crown having an inner circumferentially extending surface; a pair of shoulders formed at opposite edges of said tread; said carcass having a pair of spaced apart beads; each bead having a toe and heel portion; said carcass having a sidewall on each side of said tire extending from one of said beads to said tread; a cord reinforcing ply with radially disposed cords in said carcass extending from one of said beads to the other of said beads through each of said sidewalls and said crown; said cord ply lying closely adjacent to the outermost surface of said sidewall at about said midpoint excluding the width of any air impervious liner or inner tube; said cord ply extending gradually from about said midpoint in said sidewall to said toe of said bead and extending gradually in the other direction to said crown of said tire to be closely adjacent with the inner wall surface of said crown presenting a crescent shaped mass of rubber in vertical cross section of said tire carcass without any cord reinforcing material in said crescent shaped mass of rubber or inwardly to the inner wall surface of said carcass; said carcass having a plurality of circumferentially extending belts positioned in said crown between said tread and said cord reinforcing ply; one of said belts having wire strands extending transversely across said crown; said wire strands lie in planes that contain the axis of rotation of said tire; and said one belt being closer to said tread than the remaining ones of said belts to place said wire strands of said one belt in compression and said cords of said reinforcing ply in tension in said crown upon deflation of said tire while placing said crescent shaped mass of rubber in compression.

2. A pneumatic tire as set forth in claim 1 wherein the thickest portion of said crescent shaped mass of rubber is at the midpoint of the radial height in vertical cross section of said tire carcass.

3. A pneumatic tire comprising a carcass with an annular tread having a circumferentially extending crown integral with its inner wall surface; said crown having an inner circumferentially extending surface; a pair of shoulders formed at opposite edges of said tread; said carcass having a pair of spaced apart beads; each bead having a toe and heel; said carcass having a sidewall on each side of said tire extending from the adjacent bead to said tread; a cord reinforcing ply with radially disposed cords in said carcass extending from one of said beads to the other of said beads through each of said sidewalls and said crown; said cord ply lying closely adjacent to the outermost surface of said sidewall at about said midpoint excluding the width of any air impervious liner or inner tube; said cord ply extending gradually from about said midpoint in said sidewall to said toe of said bead and extending gradually in the other direction to said crown of said tire to be closely adjacent with the inner wall surface of said crown presenting a crescent shaped mass of rubber in vertical cross section of said tire carcass without any cord reinforcing material in said crescent shaped mass of rubber or inwardly to the inner wall surface of said carcass; said carcass having a plurality of circumferentially extending belts positioned in said crown between said tread and said cord reinforcing ply; one of said belts having wire strands extending transversely across said crown; said wire strands lie in planes that contain the axis of rotation of said tire; said one belt being closer to said tread than the remaining ones of said belts to place said wire strands of said one belt in compression and said cords of said reinforcing ply in tension in said crown upon deflation of said tire while placing said crescent shaped mass of rubber in compression; and each of said sidewalls having a lower mass of rubber external of said cord reinforcing ply in said bead region to form a lower annular compressive member adjacent to said beads.

* * * * *